United States Patent
Peuhkurinen et al.

(10) Patent No.: US 10,843,067 B1
(45) Date of Patent: Nov. 24, 2020

(54) INPUT DEVICE, SYSTEM, AND METHOD

(71) Applicant: Varjo Technologies Oy, Helsinki (FI)

(72) Inventors: Ari Antti Erik Peuhkurinen, Helsinki (FI); Roope Rainisto, Helsinki (FI)

(73) Assignee: Varjo Technologies Oy, Helsinki (FI)

( * ) Notice: Subject to any disclaimer, the term of this patent is extended or adjusted under 35 U.S.C. 154(b) by 0 days.

(21) Appl. No.: 16/592,909

(22) Filed: Oct. 4, 2019

(51) Int. Cl.
| | |
|---|---|
| *A63F 13/20* | (2014.01) |
| *A63F 13/211* | (2014.01) |
| *A63F 13/24* | (2014.01) |
| *A63F 13/218* | (2014.01) |
| *A63F 13/2145* | (2014.01) |

(52) U.S. Cl.
CPC .......... *A63F 13/211* (2014.09); *A63F 13/218* (2014.09); *A63F 13/2145* (2014.09); *A63F 13/24* (2014.09)

(58) Field of Classification Search
CPC ........ A63F 13/20; A63F 13/21; A63F 13/211; A63F 13/213; A63F 13/218; A63F 13/23; A63F 13/285; A63F 2009/2401; A63F 13/2402; A63F 13/2407; G05B 2219/35415; G05B 13/35416; G05B 13/35417; G05B 13/35419; G05B 13/35438; G05B 2219/35462; A61B 5/7475; G06F 2203/015
See application file for complete search history.

(56) References Cited

FOREIGN PATENT DOCUMENTS

WO  WO 2009/059716  *  5/2009 ............. G06F 3/048

* cited by examiner

*Primary Examiner* — Omkar A Deodhar
(74) *Attorney, Agent, or Firm* — Ziegler IP Law Group, LLC (57) ABSTRACT

An input device including first sensor that measures first sensor data indicative of at least one of: pressure applied to input device, presence or absence of given object in proximity of input device, distance of given object from input device, position and orientation of input device; and processor coupled to first sensor. Processor processes first sensor data to determine state of input device, said state indicating whether or not input device is lying on given object; obtains, from user device, context information pertaining to visual scene being presented to user; and controls input device to operate in first mode of operation or second mode of operation based on said state and context information. Input device acts as computer mouse during first mode of operation and as six-degrees-of-freedom controller during second mode of operation.

19 Claims, 3 Drawing Sheets

INPUT DEVICE, SYSTEM, AND METHOD

TECHNICAL FIELD

The present disclosure relates generally to user-interaction devices; and more specifically, to input devices comprising first sensors and processors. Moreover, the present disclosure also relates to systems comprising user devices and the aforesaid input devices. Furthermore, the present disclosure also relates to methods of using the aforesaid input devices.

BACKGROUND

In the past few decades, there has been exponential development in enhanced-reality technology. Owing to such exponential development, simulated environments such as Virtual Reality (VR) environments, Augmented Reality (AR) environments, Mixed Reality (MR) environments, and the like, have gone through a rapid development phase. The simulated environments use contemporary techniques (for like stereoscopy for providing users with a feeling of depth and immersion within the simulated environments. Furthermore, several specialized devices such as VR devices, AR devices, MR devices are being used by the users to experience and interact with the simulated environments.

Generally, users interact with the simulated environments by way of multiple specialized interaction controllers such as joysticks, remote controllers, computer mice, simulated reality consoles, and the like. In particular, a given interaction controller provides a limited range of interaction functionality to a user. For example, a remote controller allows the user to interact with the simulated environment by way of pressing buttons only.

Presently, in order to fully interact with the simulated environments, the user uses multiple interaction controllers. In an example, the user may interact with a given virtual reality game environment using a remote controller and a computer mouse. However, the use of multiple interaction controllers for interacting with the simulated environments makes such interactions quite complicated and difficult. Typically, the user is required to manually changeover from using one interaction controller to another, whilst engaging with the simulated environments. This requires considerable effort on part of the user, which leads to suboptimal immersion of the user whilst he/she performs said manual changeover. Furthermore, electro-magnetic fields from the multiple interaction controllers often interfere with each other and interrupt smooth functioning of each other. In such a case, handling the multiple interaction controllers in a suitable, non-interfering manner is troublesome for the users.

Therefore, in light of the foregoing discussion, there exists a need to overcome the aforementioned drawbacks associated with the conventional interaction controllers for interacting with and experiencing simulated environments.

SUMMARY

The present disclosure seeks to provide an input device. The present disclosure also seeks to provide a system comprising a user device and an input device. The present disclosure also seeks to provide a method. The present disclosure seeks to provide a solution to the existing problem of using multiple interaction controllers whilst interacting with a visual scene. An aim of the present disclosure is to provide a solution that overcomes at least partially the problems encountered in prior art, and provides a single input device that can be operated in multiple modes to act as multiple interaction controllers.

In one aspect, an embodiment of the present disclosure provides an input device comprising:
at least one first sensor that, in operation, measures first sensor data indicative of at least one of: a pressure applied to a given surface of the input device, a presence or an absence of a given object in a proximity of the given surface of the input device, a distance of the given object from the given surface of the input device, a position and an orientation of the input device; and
a processor coupled to the at least one first sensor, the processor being configured to:
process the first sensor data to determine a state of the input device, wherein the state of the input device is indicative of whether or not the input device is lying on the given object;
obtain, from a user device, context information pertaining to a visual scene being presented to a user; and
control the input device to operate in a first mode of operation or a second mode of operation based on the determined state of the input device and the obtained context information,
wherein the input device, in operation, acts as a computer mouse during the first mode of operation and as a six-degrees-of-freedom controller during the second mode of operation.

In another aspect, an embodiment of the present disclosure provides a system comprising:
a user device that, in operation, provides a user with a user interface; and
an input device communicably coupled to the user device, the input device comprising:
  at least one first sensor that, in operation, measures first sensor data indicative of at least one of: a pressure applied to a given surface of the input device, a presence or an absence of a given object in a proximity of the given surface of the input device, a distance of the given object from the given surface of the input device, a position and an orientation of the input device; and
  a processor coupled to the at least one first sensor, the processor being configured to:
    process the first sensor data to determine a state of the input device, wherein the state of the input device is indicative of whether or not the input device is lying on the given object;
    obtain, from the user device, context information pertaining to a visual scene being presented to the user; and
    control the input device to operate in a first mode of operation or a second mode of operation based on the determined state of the input device and the obtained context information,
wherein the system enables the user to interact with the user interface by operating the input device as a computer mouse during the first mode of operation and as a six-degrees-of-freedom controller during the second mode of operation.

In yet another aspect, an embodiment of the present disclosure provides a method comprising:
measuring, via at least one first sensor of an input device, first sensor data indicative of at least one of: a pressure applied to a given surface of the input device, a presence or an absence of a given object in a proximity of the given surface of the input device, a distance of the given object from the given surface of the input device, a position and an orientation of the input device;

processing the first sensor data to determine a state of the input device, wherein the state of the input device is indicative of whether or not the input device is lying on the given object;

obtaining, from a user device, context information pertaining to a visual scene being presented to a user; and controlling the input device to operate in a first mode of operation or a second mode of operation based on the determined state of the input device and the obtained context information, wherein the input device is operated as a computer mouse during the first mode of operation and as a six-degrees-of-freedom controller during the second mode of operation.

Embodiments of the present disclosure substantially eliminate or at least partially address the aforementioned problems in the prior art, and enable a single input device to be operated in multiple modes to provide the user with interaction functionality of multiple interaction controllers.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides an input device comprising:

at least one first sensor that, in operation, measures first sensor data indicative of at least one of: a pressure applied to a given surface of the input device, a presence or an absence of a given object in a proximity of the given surface of the input device, a distance of the given object from the given surface of the input device, a position and an orientation of the input device; and a processor coupled to the at least one first sensor, the processor being configured to:

process the first sensor data to determine a state of the input device, wherein the state of the input device is indicative of whether or not the input device is lying on the given object;

obtain, from a user device, context information pertaining to a visual scene being presented to a user; and control the input device to operate in a first mode of operation or a second mode of operation based on the determined state of the input device and the obtained context information, wherein the input device, in operation, acts as a computer mouse during the first mode of operation and as a six-degrees-of-freedom controller during the second mode of operation.

In another aspect, an embodiment of the present disclosure provides a system comprising:

a user device that, in operation, provides a user with a user interface; and an input device communicably coupled to the user device, the input device comprising:

at least one first sensor that, in operation, measures first sensor data indicative of at least one of: a pressure applied to a given surface of the input device, a presence or an absence of a given object in a proximity of the given surface of the input device, a distance of the given object from the given surface of the input device, a position and an orientation of the input device; and a processor coupled to the at least one first sensor, the processor being configured to:

process the first sensor data to determine a state of the input device, wherein the state of the input device is indicative of whether or not the input device is lying on the given object;

obtain, from the user device, context information pertaining to a visual scene being presented to the user; and control the input device to operate in a first mode of operation or a second mode of operation based on the determined state of the input device and the obtained context information, wherein the system enables the user to interact with the user interface by operating the input device as a computer mouse during the first mode of operation and as a six-degrees-of-freedom controller during the second mode of operation.

In yet another aspect, an embodiment of the present disclosure provides a method comprising:

measuring, via at least one first sensor of an input device, first sensor data indicative of at least one of: a pressure applied to a given surface of the input device, a presence or an absence of a given object in a proximity of the given surface of the input device, a distance of the given object from the given surface of the input device, a position and an orientation of the input device;

processing the first sensor data to determine a state of the input device, wherein the state of the input device is indicative of whether or not the input device is lying on the given object;

obtaining, from a user device, context information pertaining to a visual scene being presented to a user; and controlling the input device to operate in a first mode of operation or a second mode of operation based on the determined state of the input device and the obtained context information, wherein the input device is operated as a computer mouse during the first mode of operation and as a six-degrees-of-freedom controller during the second mode of operation.

The present disclosure provides the aforementioned input device, system and method. The input device disclosed herein acts as the computer mouse or the six-degrees-of-freedom controller based upon the state of the input device and context information of the visual scene presented to the user. The aforesaid input device eliminates requirement of using multiple interaction controllers for interacting with the user device. The input device described herein does not require manual changeover whilst switching between different modes of operation. The input device provides functionalities of different specialized interaction controllers in different modes of operation Furthermore, the input device provides automatic switching of modes of operation of the input device based upon practical parameters such as the state of the input device and the context information of the visual scene being presented to the user. Therefore, the input device allows for a simple and seamless interaction between the user and the user device. Beneficially, the input device reduces an effort on part of the user for interacting with the user device. The user is provided with a continuous, immersive, and realistic experience of the visual scene whilst interacting with the input device. Furthermore, the system disclosed herein is simple, user-friendly, and robust. It will be appreciated that components of the aforementioned system do not interfere with each other, thereby allowing smooth functioning of each other. Moreover, the aforementioned method is simple, and allows the user to interact with the user device in real time or near real time.

Throughout the present disclosure, the term "input device" refers to a hardware device that is to be used by the user to provide an input to the user device. The user provides the input in order to control (namely, manage) functioning of the user device. Notably, the input device is associated with the user device.

Throughout the present disclosure, the term "first sensor" refers to a specialized component that, in operation, senses and/or monitors at least one physical parameter associated with the input device. Examples of the at least one physical parameter associated with the input device include, but are not limited to, a pressure, a proximity with another object, a position, and an orientation.

Optionally, the at least one first sensor is implemented as at least one pressure sensor. The at least one pressure sensor measures the pressure applied to the given surface of the input device. Optionally, the given surface is a surface of the input device that comes in contact with the user while the user uses the input device. Additionally or alternatively, optionally, the given surface is a surface of the input device that comes in contact with the given object when the input device lies on the given object. Notably, a magnitude of the pressure applied on the given surface of the input device varies for different ways of holding the input device.

In an example, the pressure applied on side surfaces of the input device may increase when the user grabs and picks up the input device. In such a case, the input device may be operated to act as the six-degrees-of-freedom controller. In another example, if the given surface is a bottom surface of the input device and the (measured) pressure is equal to a predefined pressure (namely, a weight of the input device divided by an area of the bottom surface), it could mean that the input device is kept on a substantially-flat surface (for example, a table top). In such a case, the input device may be operated as the computer mouse.

Optionally, the at least one first sensor is implemented as at least one proximity sensor or at least one optical sensor. The at least one proximity sensor or the at least one optical sensor measure a closeness of the given object to the given surface of the input device. Examples of the given object include, but are not limited to, a table top, a mouse pad, a stand for the input device, and a note-book. Notably, presence of the given object in proximity of the given surface of the input device indicates that the input device is either near the given object or is lying on the given object.

At an instance, the at least one first sensor is implemented as at least one proximity sensor. Examples of the at least one proximity sensor include, but are not limited to, a capacitive proximity sensor, and an inductive sensor.

At another instance, the at least one first sensor is implemented as the at least one optical sensor. In such a case, the at least one first sensor determines a distance between the given object and the given surface of the input device by emitting light and observing how the given object and the given surface of the input device affect an optical path of the emitted light. The optical sensor observes the optical path of the emitted light for occurrence of reflection(s), refraction(s), distortion(s) by the given object and/or the given surface of the input device. Examples of the optical sensor include, but are not limited to, a laser sensor, an infra-red (IR) sensor and a structured light sensor.

In an example, when the proximity sensor detects the given object to be in proximity of a bottom surface of the input device, the input device may be lying on the given object. In such a case, the input device may be operated in the first mode of operation to act as the computer mouse. In another example, when distances between the given object and all surfaces of the input device are greater than a predefined distance, the input device may be understood to not lie in proximity of the given object. In such an example, the input device may be held in the hand of the user. In such a case, the input device may be operated in the second mode of operation to act as the six-degrees-of-freedom controller.

Optionally, the at least one first sensor is implemented as at least one inertial measurement unit (IMU). The at least one IMU measures a position, an angular motion, and orientation of the input device. Optionally, the at least one IMU is implemented as at least one of: an accelerometer, a gyroscope, a magnetometer. It will be appreciated that said at least one first sensor generates an information indicative of a position and an orientation of the input device. As an example, the input device may be at a certain three-dimensional (3D) position and orientation when it is lying on a substantially-flat surface (for example, a table top). The 3D position and orientation of the input device may be measured via an IMU. Even when the input device is not lying on a perfectly horizontal flat surface, if the input device is in the same 3D position and orientation for a given time period, the processor may determine the input device to be lying on said surface. In such a case, the processor may control the input device to operate in the first mode of operation to act as the computer mouse.

Throughout the present disclosure the term "processor" refers to hardware, software, firmware or a combination of these. The processor is communicably coupled to the at least one first sensor wirelessly and/or in a wired manner. The processor controls operation of the input device, causing the input device to operate in the first mode of operation or the second mode of operation.

Throughout the present disclosure, the phrase "state of the input device" refers to a condition of the at least one physical parameter associated with the input device, at a given time. In particular, the state of the input device is indicative of whether or not the input device is lying on the given object. In an example, when the first sensor data indicates that a small magnitude of pressure is applied on the given surface of the input device, the processor may determine that the input device is lying on the given object. In another example, when the first sensor data indicates that the distance of the given object from the given surface of the input device is greater than a given threshold value, the processor may determine that the input device is not lying on the given object.

The processor obtains, from the user device, the context information pertaining to the visual scene being presented to the user. Herein, the term "user device" refers to a specialized computing device configured to perform at least one computing task based upon the input (namely, an instruction, a command, and the like) received from the user. Examples of the user device include, but are not limited to, a head-mounted display apparatus, a smart television, a computer, and a tablet. The visual scene represents a digital media (for example, an animated movie, a game, a virtual reality environment, an augmented reality environment, a mixed reality environment, and the like).

Moreover, the phrase "context information of the visual scene" refers to information pertaining to a fundamental context (namely, setting or theme) of the visual scene. Notably, the context information of the visual scene pertains to a nature of the visual scene. Additionally, said context information also pertains to a nature of the at least one computing task that can be performed for the visual scene. In simpler terms, the context information can be understood to be a reference metadata of the visual scene, said reference metadata pertaining to a topic of the visual scene, a genre of the visual scene, a duration of the visual scene, a backdrop of the visual scene, a subject of the visual scene, and the like.

Optionally, the context information of the visual scene pertains to a type of the visual scene being presented to the user. Optionally, the type of visual scene is one of: a digital visual scene, a virtual reality visual scene, an augmented reality visual scene, a mixed reality visual scene. Optionally, the type of visual scene is the genre of the visual scene. In an example, a type of visual scene may be a mixed reality game. In such a case, using the input device as the six-degrees-of-freedom controller may be recommended and/or preferred.

Optionally, the context information of the visual scene pertains to a manner in which the user interacts with the visual scene. In an embodiment, the context information of the visual scene indicates that both the first mode of operation and the second mode of operation can be used to interact with the visual scene. In such a case, the user may choose to operate the input device in either the first mode of operation or the second mode of operation, based on his/her discretion. In another embodiment, the context information of the visual scene is indicative of a historical record of how the user previously operated the input device. As an example, at a previous instance when a given visual scene was presented to the user, the input device was operated in the first mode of operation. Therefore, at a present instance when the given visual scene is again presented to the user, the input device may be operated again in the first mode of operation.

The processor controls the input device to operate in the first mode of operation to act as the computer mouse. Alternatively, the processor controls the input device to operate in the second mode of operation to act as the six-degrees-of-freedom controller. Notably, the processor controls the input device to operate in the first mode of operation or in the second mode of operation based upon the context information of the visual scene and the determined state of the input device.

The input device disclosed herein is a single interaction controller that is used for interacting with the user device, wherein the input device provides functionalities of different specialized interaction controllers in different modes of operation. Therefore, the user only needs to handle a single input device for utilizing functionalities of the different specialized interaction controllers. The user comfortably interacts with the user device, as the user is not required to manually switch between different modes of operation. The mode of operation of the input device is switched automatically by the processor, based upon the context information of the visual scene and the state of the input device. Such parameters for deciding a current mode of operation are practical and relevant, thereby serving as optimal criteria in deciding a current mode of operation.

It will be appreciated that the input device is to be operated in the first mode of operation when the input device is lying on the given object, and the input device is to be operated in the second mode of operation when the input device is held in the air or is in transition from the state of lying on the given object to the state of being held in the air. When the input device is not lying on the given object, the input device may be held in air or may be in a transition state (namely, when the user is picking up the device from the given object). Notably, the input device is operated in the first mode of operation to act as the computer mouse for interacting with the visual scene by way of pointing, clicking, drag and drop, or any other functionality provided by the computer mouse. Alternatively, the input device is operated in the second mode of operation to act as the six-degrees-of-freedom controller for interacting with the visual scene by way of making hand gestures, hand movements, translations, rotations, and so forth.

Moreover, it will also be appreciated that the input device is to be operated in the first mode of operation or in the second mode of operation based upon a context information (namely, nature or theme) of the visual scene presented to the user. Notably, the context information of the visual scene provides an extremely valuable basis for determining which mode of operation is best suited (namely, optimal) for the user to comfortably interact with the visual scene. For example, a given visual scene that requires precise inputs from the user (for example, a virtual reality shooting game) may require the input device to be operated in the first mode of operation, whereas a given visual scene that requires inexact inputs from the user (for example, a virtual reality cooking tutorial) may require the input device to be operated in the second mode of operation.

In an example, when the visual scene is a virtual reality game (such as badminton, tennis, and the like), the context information pertaining to the visual scene may indicate that the virtual reality game is to be played by the user by moving his/her hand as though the user is holding a racquet in his/her hand. In such a case, the input device may be controlled to operate in the second mode of operation.

In another example, when the visual scene is a mixed reality educational video, the context information pertaining to the visual scene may indicate that the user can interact with the video via clicking or hand gestures. In such a case, the input device may be controlled to operate:

in the first mode of operation, when the user chooses to interact with the video via clicking;

in the second mode of operation, when the user chooses to interact with the video via the hand gestures. In such a case, the user may choose any mode of operation for operating the input device.

At an instance when the input device is operated in the first mode of operation to act as the computer mouse, the user can operate by moving the input device on the given object. The input device is moved across a surface of the given object upon which the input device is placed. Moreover, the input device is kept in contact with the given object at all times whilst the first mode of operation is being employed. Notably, the user interacts with the user device by way of at least one of: clicking the input device, dragging the input device, scrolling using the input device, and the like.

It will be appreciated that when the input device is operated to act as the computer mouse, the user provides his/her input in a convenient manner by simply moving the input device on the given object. In this scenario, the user is required to apply minimal effort to move and use the input device. Furthermore, the ease of operating the input device as the computer mouse allows the user to engage closely with the visual scene.

At another instance when the input device is operated in the second mode of operation to act as the six-degrees-of-freedom controller, the user can hold the input device in his/her hand(s) and move it freely in a real-world environment where the user is positioned. In the second mode of operation, the input device is movable in three dimensions to provide the input to the user device by way of three-dimensional physical movements (for example, such as hand gestures). The six-degrees-of-freedom controller is translationally movable and rotatably movable in three-dimensional space.

It is to be appreciated that when the input device is operated to act as the six-degrees-of-freedom controller, the user provides the input by rotating and/or translating the input device in space. Notably, such an operation of the input device in the second mode of operation allows for an easy, realistic, and user-friendly way of providing input to the user device. Moreover, actually physically moving the input device in three dimensions allows the user to engage both physically and mentally with the visual scene.

Optionally, the input device further comprises a timer that, in operation, measures a time period during which the input device is in a given state, the given state of the input device is indicative of one of: the input device lying on the given object, the input device being held in air, the input device being in transition, wherein the processor is configured to control the input device to operate in the first mode of operation or the second mode of operation based on the time period during which the input device is in the given state.

In this regard, the timer is an electronic and/or software-based component that, in operation, measures (namely, counts) a time period (for example, in seconds, in minutes, and the like) for which the input device is in a given state.

It will be appreciated that the input device may or may not lie on the given object. When the input device is held in air or is in transition, the input device does not lie on the given object.

Optionally, when the input device lies on the given object for a time period that is greater than a specific time period, the input device is controlled to operate in the first mode of operation. Alternatively, optionally, when the input device lies on the given object for a time period that is smaller than a specific time period, the input device is controlled to operate in the second mode of operation.

Optionally, when the input device is held in air or is in transition for a time period that is greater than a specific time period, the device is controlled to operate in the second mode of operation. Alternatively, optionally, when the input device is held in air or is in transition for a time period that is smaller than a specific time period, the input device is controlled to operate in the first mode of operation.

Optionally, the specific time period is one of: 0.1 second, 0.2 second, 0.3 second, 0.4 second, 0.5 second, 0.6 second, 0.7 second, 0.8 second, 0.9 second, 1 second, 2 seconds, 3 seconds, 4 seconds, 5 seconds, 6 seconds, 7 seconds, 8 seconds, 9 seconds, 10 seconds.

Optionally, the processor is configured to obtain historical data pertaining to a state of the input device during a predefined time period, and to control the input device to operate in the first mode of operation or the second mode of operation based on the historical data. Optionally, in this regard, the historical data is generated by collating a history of previous state(s) of the input device during the predefined time period. Optionally, the historical data is generated by a processing module coupled to the timer.

Optionally, in this regard, the processor utilizes the historical data to control the input device to operate in a current mode of operation that is same as an immediately preceding mode of operation; or control the input device to operate in a current mode of operation that is different from an immediately preceding mode of operation.

It will be appreciated that the historical data further pertains to occurrences that happen to the input device. Notably, the occurrences that happen to the input device, affect a manner of switching between different modes of operation. Optionally, the processor controls the input device to: operate in a specific mode of operation, when the user lifts off the input device after moving the input device on the given object; or operate in a different mode of operation, when there is a pause in the movement of the input device before the user lifts off the input device.

Optionally, the processor is configured to control the input device to operate in any of: the first mode of operation, the second mode of operation, a third mode of operation, based on the distance of the given object from the given surface of the input device.

Optionally, the processor controls the input device to operate in the first mode of operation when the distance of the given object from the given surface of the input device is lesser than or equal to a lower threshold distance. The lower threshold distance may be, for example, 0 centimeters, 2 centimeters, 4 centimeters, 6 centimeters, 8 centimeters, or 10 centimeters.

Optionally, the processor controls the input device to operate in the second mode of operation when the distance of the given object from the given surface of the input device is greater than or equal to an upper threshold distance. The upper threshold distance may be, for example, 1 centimeter, 3 centimeters, 5 centimeters, 7 centimeters, 9 centimeters, or 11 centimeters.

Optionally, the processor controls the input device to operate in the third mode of operation when the distance of the given object from the given surface of the input device lies between the lower threshold distance and the upper threshold distance. The third mode of operation is a hybrid mode of operation in which the input device has at least one functionality of the first mode of operation and/or at least one functionality of the second mode of operation. The third mode of operation is utilized as a transition mode of the input device during a time period in which the input device transitions from one mode of operation to another. Moreover, the third mode of operation allows at least one functionality of a current mode of operation (from which the input device is switching) and at least one functionality of an upcoming mode (to which the input device is switching). Beneficially, the third mode of operation eliminates possible abruptness in functionality of the input device while transitioning from the current mode of operation to the upcoming mode of operation. In addition, the third mode of operation provides seamless transition of the input device from the current mode of operation to the upcoming mode of operation. Such seamless transition provides the user with an uninterrupted experience of using the input device. Notably, controlling the input device to operate in the third mode of operation while switching between the first and second modes of operation allows for the seamless transition. Beneficially, the seamless transition provides a continuity of immersive experience while viewing the visual scene.

As an example, a current mode of operation is the first mode of operation and an upcoming mode of operation is the second mode of operation. Notably, while transitioning from the current mode of operation to the upcoming mode of operation, the input device operates in the third mode of operation. The input device, when operating in the third mode, provides the user with a drag and drop functionality of the first mode of operation and a hand gesture input functionality of the second mode of operation.

Optionally, the processor is configured to:

process the first sensor data to detect whether the input device is being held with a single hand of the user or with both hands of the user; and control the input device to activate or deactivate a given feature provided to the user during a given mode of operation, depending on whether the input device is being held with the single hand of the user or with both the hands of the user.

Optionally, in this regard, a pressure applied to the given surface of the input device when the user holds the input device with one hand, is lesser than a pressure applied to the given surface of the input device when the user holds the input device with both hands. In such a case, the first sensor data is indicative of the pressure applied to the given surface of the input device.

It will be appreciated that a given input corresponding to the given feature may be realistically suitable for a scenario when the input device is held with the single hand, whereas the given input may not be realistically suitable for another scenario when the input device is held with both the hands, and vice versa. In such a case, controlling the input device to activate or deactivate the given feature in the aforesaid manner emulates a manner in which the user can realistically interact with the visual scene using the single hand or both the hands. This considerably enhances the user's experience of interacting with the visual scene.

As an example, the input device may be operating in the second mode of operation. In a first case, the user may hold the input device with one hand. In such case, a grabbing feature provided to the user during the second mode of operation may be activated by the processor. In a second case, the user may hold the input device with both his/her hands. In such a case, the grabbing feature may be deactivated.

Optionally, the processor is configured to:

process the first sensor data to detect a manner in which the user grips the input device; and control the input device to operate in the first mode of operation or the second mode of operation based on the manner in which the user grips the input device.

Herein, the phrase "manner in which the user grips the input device" encompasses at least one of:

an intensity with which the user grips the input device;

a region of the input device from where the user grips the input device;

a duration for which the user grips the input device.

It will be appreciated that the user grips the input device in a specific manner, as per his/her convenience and comfort. The user may grip the input device with high intensity (namely, a firm grip) or low intensity (namely, a light grip). The user may grip the input device from different regions (for example, from a top region, from side regions, and the like). The user may grip the input device for a short time period or a long time period. Different manners of gripping the input device cause the processor to operate the input device in different modes of operation. Notably, the input device is operated in that mode of operation which provides suitable features for interaction with the visual scene, given a current manner in which the user grips the input device.

In an example, when the input device is gripped lightly by the user, the input device may be controlled to operate in the first mode of operation. Alternatively, when the input device is gripped firmly by the user, the input device may be controlled to operate in the second mode of operation. In another example, when the user grips the input device from a top surface of the input device, the input device may be controlled to operate in the first mode of operation. Alternatively, when the user grips the input device from side surfaces of the input device, the input device may be controlled to operate in the second mode of operation. In yet another example, when the input device is momentarily gripped by the user, the input device may be controlled to operate in the first mode of operation. Alternatively, when the input device is gripped for a prolonged time period by the user, the input device may be controlled to operate in the second mode of operation.

Optionally, the input device further comprises at least one second sensor that, in operation, measures second sensor data indicative of at least one of: a position and an orientation of a hand of the user that is not used to hold the input device, a posture of the user, wherein the processor is configured to:

process the second sensor data to determine the position and the orientation of the hand and/or the posture of the user; and control the input device to operate in the first mode of operation or the second mode of operation based on the position and the orientation of the hand and/or the posture of the user.

Throughout the present disclosure, the term "second sensor" refers to a specialized component that, in operation, senses and/or monitors at least one physical parameter associated with the user. Examples of the at least one physical parameter associated with the user include, but are not limited to, a pose of the hand of the user that is not used to hold the input device, and the posture of the user. The term "pose" encompasses both position and orientation. Examples of the at least one second sensor include, but are not limited to, an optical camera sensor (for example, a laser sensor, an IR sensor and the like), a camera, proximity sensors, electromagnetic sensors, motion sensors.

In this regard, the position and orientation of the hand of the user that is not used to hold the input device can be different, thereby, causing the processor to operate the input device in different modes of operation. Said hand of the user could be arranged at any position and orientation, according to comfort of the user whilst the user uses the input device. In an embodiment, when the hand that is not used to hold the input device is positioned and oriented to support the hand holding the input device, the input device is controlled to operate in the second mode of operation. In another embodiment, when the hand that is not used to hold the input device is positioned and oriented in a manner that said hand lies in a state of rest, irrespective of motion of the hand holding the input device, the input device is controlled to operate in the first mode of operation. In yet another embodiment, when the hand that is not used to hold the input device is positioned and oriented in a manner that said hand is in motion, the input device is controlled to operate in the second mode of operation.

Furthermore, the posture of the user can be different, thereby, causing the processor to operate the input device in different modes of operation. Notably, the user can position (namely, arrange) his/her body differently, depending upon his/her comfort and requirement. In an embodiment, when the posture of the user is a standing posture, the input device is controlled to operate in the second mode of operation. In another embodiment, when the posture of the user is a sitting posture, the input device is controlled to operate in the first mode of operation. In yet another embodiment, when the posture of the user is an open posture, the input device is controlled to operate in the second mode of operation; and when the posture of the user is a closed posture, the input device is controlled to operate in the first mode of operation.

Optionally, the at least one second sensor is implemented as at least one optical camera sensor. The at least one optical camera sensor recognizes at least one of: features of the hand of the user that is not used to hold the input device, physical features of the user's body. The features of the hand of the user that is not used to hold the input device are indicative of a geometry of the user. Said hand of the user may be open, closed (for example, as a fist), skewed, and the like. The physical features of the user's body may be skeletal framework of the user's body, body heat of the user's body, and the like. As an example, the at least one optical camera sensor may recognize that the hand of the user that is not used to hold the input device is closed. In such a case, the processor may control the input device to operate in the second mode of operation. As another example, the at least one optical camera sensor may recognize that the skeletal framework of the user's body is similar to that of a sitting position. In such a case, the processor may control the input device to operate in the first mode of operation.

Optionally, the at least one second sensor is implemented as at least one proximity sensor. The proximity sensor, in operation, measures closeness of the input device with the hand that is not used to hold the input device. In an embodiment, when the input device is in proximity of the hand that is not used to hold the input device, the input device is controlled to operate in the second mode of operation, and when the input device is not in proximity of the input device, the input device is controlled to operate in the first mode of operation.

Optionally, the at least one second sensor is implemented as at least one electromagnetic sensor. The at least one electromagnetic sensor senses presence or absence of the input device in proximity of the hand of the user that is not used to hold the input device by detecting presence or absence of an electromagnetic field of the input device, respectively. The at least one electromagnetic sensor is arranged on said hand of the user. In an embodiment, when the at least one electromagnetic sensor senses presence of the electromagnetic field of the input device, the input device is controlled to operate in the second mode of operation, and when the at least one electromagnetic sensor senses absence of the electromagnetic field of the input device, the input device is controlled to operate in the first mode of operation.

Optionally, the at least one second sensor is implemented as at least one motion sensor. The at least one motion sensor senses at least one of: motion of the hand of the user that is not used to hold the input device, motion of the user's body. In an embodiment, when the at least one motion sensor detects movement of the hand that is not used to hold the input device, the input device is controlled to operate in the second mode of operation, and when the at least one motion sensor detects infrequent or no movement of the hand that is not used to hold the input device, the input device is controlled to operate in the first mode of operation. In an embodiment, when the at least one motion sensor detects frequent movement of the user's body and/or change in position of the user's body, the input device is controlled to operate in the second mode of operation, and when the at least one motion sensor detects infrequent or no movement in user's body and/or change in position of the user's body, the input device is controlled to operate in the first mode of operation.

Optionally, the at least one second sensor is implemented as at least one light sensor. The at least one light sensor recognizes the posture of the user by capturing an image or a video of the user's body.

In an embodiment, the at least one second sensor is mounted on a wearable device that is worn by the user. Optionally, the wearable device is worn by the user on the hand that is not used to hold the input device. In such a case, the at least one second sensor is implemented as: the at least one optical camera sensor, the at least one proximity sensor, the at least one electromagnetic sensor, the at least one light sensor, and/or the at least one motion sensor. Additionally or alternatively, optionally, the wearable device is worn on any body part of the user (for example, on an arm, around the neck, on a leg, and the like). In such a case, the at least one second sensor is implemented as: the at least one motion sensor, the at least one optical camera sensor, and/or the at least one light sensor.

In another embodiment, the at least one second sensor is arranged in the real-world environment where the user uses the input device. In such a case, the at least one second sensor is implemented as: the at least one proximity sensor, the at least one electromagnetic sensor, the at least one optical camera sensor, and/or the at least one light sensor.

In yet another embodiment, the at least one second sensor comprises a plurality of second sensors, wherein the plurality of second sensors are mounted on a wearable device that is worn by the user and are arranged in the real-world environment where the user uses the input device.

Optionally, the input device further comprises at least one third sensor that, in operation, measures third sensor data indicative of a movement of the input device relative to a surface of the given object upon which the input device is lying, wherein the movement of the input device is to be sensed when the input device is operated in the first mode of operation,
wherein the processor is configured to process the third sensor data to generate information indicative of said movement of the input device.

In this regard, the generated information indicative of said movement of the input device is sent by the processor to the user device with which the input device is communicably coupled. Optionally, the information indicative of said movement of the input device comprises a corresponding movement that is to be implemented within the visual scene.

Optionally, the at least one third sensor is implemented as a physical ball-in-socket sensor or an optical sensor. Such sensors are well-known in the art. In an example, the input device, when operated in the first mode of operation, provides a cursor within the visual scene presented to the user. The input device may comprise the ball-in-socket sensor for tracking the movement of the input device relative to the surface of the given object upon which the input device is kept. The user may use the cursor to select objects present in the visual scene. A rotation of the ball (in the socket) may be tracked to determine displacement (for example, such as 5 centimeters) of the input device. The processor may process said displacement to implement, at the user device, a corresponding movement (for example, such as 1 centimeter) of the cursor within the visual scene.

Optionally, the input device lies on an active mouse pad that is configured to track the movement of the input device with respect to a surface of the active mouse pad upon which the input device is lying. In such a case, the active mouse pad acts as the at least one third sensor. The active mouse pad tracks the movement of the input device using proximity sensing, magnetic field sensing, optical sensing, or any other means capable of localizing the input device on the active mouse pad. The active mouse pad is further configured to communicate the sensed relative movement of the input device to the processor, and the processor is configured to generate the information indicative of said movement of the input device.

Optionally, the input device further comprises an emitter that, in operation, emits signals, wherein the input device is to be used with an external system comprising at least one receiver that, in operation, senses the emitted signals and generates fourth sensor data,
wherein the external system comprises a processing unit configured to process the fourth sensor data to determine a relative position and orientation of the emitter with respect to the at least one receiver.

Alternatively, optionally, the input device is to be used with an external system comprising an emitter that, in operation, emits signals, wherein the input device further comprises a receiver that, in operation, senses the emitted signals and generates fourth sensor data,
wherein the external system comprises a processing unit, communicably coupled to the input device, configured to process the fourth sensor data to determine a relative position and orientation of the receiver with respect to the emitter.

Optionally, the relative position and orientation of the emitter with respect to the receiver and vice versa is determined in order to track a position and an orientation of the input device with respect to the external system.

Throughout the present disclosure, the term "emitter" refers to an electronic device that emits signals that propagate in the real-world environment where the emitter is present. The signals emitted by the emitter are sensed by the at least one receiver arranged within the real-world environment. Examples of the signals emitted by the emitter include, but are not limited to: electromagnetic signals, acoustic signals. Furthermore, the term "receiver" refers to an electronic device that, in operation, receives the signals emitted by the emitter and generates the fourth sensor data.

It will be appreciated that the at least one receiver is compatible with the emitter. In other words, the at least one receiver is capable of sensing a type of the signals that are emitted by the emitter. It will be appreciated that such an emitter-receiver configuration allows for six Degrees of Freedom (6DoF) tracking (namely, three-dimensional position tracking and three-dimensional orientation tracking) of the input device.

Herein, the term "fourth sensor data" refers to sensor data that is indicative of the relative position and orientation of the emitter with respect to the at least one receiver. The external system is a specialized device that is coupled to the input device via the aforesaid emitter-receiver configuration. The external system facilitates three-dimensional localization of the input device.

Optionally, the processing unit of the external system employs at least one mathematical formula for determining the relative position and orientation of the emitter with respect to the at least one receiver, said at least one mathematical formula being different for processing the fourth sensor data associated with different types of the emitted signals. As an example, when the emitted signals are electromagnetic signals, a measured strength of induced current and/or induced voltage along three coordinate axes of the at least one receiver may be used to determine the relative three-dimensional position and orientation of the at least one receiver with respect to the emitter.

Optionally, the fourth sensor data comprises measurements of at least one signal characteristic of signals sensed by the at least one receiver, the at least one signal characteristic comprising at least one of: a strength, a phase, a wavelength, a frequency, a time-of-flight, an angle of arrival, a polarization, a Doppler spread, a delay spread, a delay signature. Optionally, the at least one signal characteristic to be measured depends upon the type, and optionally, a wavelength of the emitted signals.

Optionally, when the three-dimensional position and three-dimensional orientation of the input device is tracked by way of the electromagnetic signals, said electromagnetic signals are used to charge the input device.

Optionally, the three-dimensional position and three-dimensional orientation of the input device is tracked using visual based camera tracking. Said visual based camera tracking is implemented as laser-beam based tracking, structured-light based tracking, simultaneous localization and mapping (SLAM) and the like.

Optionally, the input device further comprises means for changing a form factor of the input device, wherein the processor is configured to employ said means when the mode of operation of the input device changes from/to the first mode of operation to/from the second mode of operation. Herein, the term "form factor" refers to a size, a shape and physical specifications of the input device. Beneficially, the form factor is changed to adapt to a physical configuration that is suitable for holding and/or using the input device when operating in any one of the first mode of operation or the second mode of operation. A suitable form factor considerably improves the user's experience of using the input device.

Optionally, the means for changing the from factor of the input device is implemented as at least one actuator. The at least one actuator is a specialized device that is configured to change at least one of: the shape, the size, the physical specifications of the input device. Notably, a required form factor of the input device, when the input device operates in the first mode of operation, is different from a required from factor of the input device, when the input device operates in the second mode of operation.

Optionally, at least a portion of the input device is made of a flexible material. The means for changing the form factor is coupled to the flexible material. The means, in operation, changes a shape of the flexible material, that in turn, changes the form factor of the input device.

In an example, the means for changing the form factor is coupled to two sides of the input device, said two sides being made of the flexible material. At an instance when the input device is to be operated in the second mode of operation, the processor may employ said means to slide the movable sides in an inward direction. This would create an inwardly-curved structural profile of the input device, which would allow the user to comfortably grip the input device in his/her hand. At another instance when the input device is to be operated in the first mode of operation, the processor may employ said means to slide the movable sides in an outward direction. This would create an outwardly-curved structural profile of the input device, which would allow the user to conveniently move the input device on the given object. Such an example has been illustrated in conjunction with FIGS. 4A and 4B, for the sake of clarity.

Optionally, the input device further comprises at least one control button that enables the user to activate or deactivate at least one feature provided to the user, wherein a given feature that is provided by a given control button during the first mode of operation is different from a given feature that is provided by the given control button during the second mode of operation. Generally, functionality provided by the input device during the first mode of operation is different from functionality provided by the input device during the second mode of operation, as a manner of using the input device is considerably different in different modes of operation. In such a case, the given control button is required to provide different features during different modes of operation.

As an example, the input device may comprise a first control button and a second control button. The first control button may provide a clicking feature in the first mode of operation and a grabbing feature in the second mode of operation. The second control button may provide a dragging feature in the first mode of operation and a pushing feature in the second mode of operation. In this way, each control button is capable of providing two features, wherein a current feature to be provided is activated or deactivated based on a current mode of operation of the input device.

Optionally, the input device further comprises at least one touch-sensitive area that enables the user to perform at least one touch gesture. Optionally, in this regard, the at least one touch-sensitive area is implemented as at least one of: a touch-sensitive display, a touch-sensitive touchpad. The user performs the at least one touch gesture to provide at least one input for interacting with the visual scene. Examples of the at least one touch gesture include, but are not limited to, a swipe gesture, a pinch gesture, a tap gesture, a scroll and pan gesture, a drag gesture.

In an example, the user may be playing a virtual reality car racing game using the input device in the first mode of operation. The user may perform a left swipe gesture to provide an input that causes a car to make a left turn within the visual scene and may perform a right swipe gesture to provide another input that causes the car to make a right turn within the visual scene.

Optionally, the input device further comprises visual indicators that, in operation, indicate to the user a current mode of operation of the input device. Optionally, in this regard, the indication provided by the visual indicators is one of: a colour-based indication, an image indication, a textual indication. Optionally, the visual indicators are implemented as light-emitting elements or displays. Beneficially, said indication allows the user to identify which mode of operation the input device is currently operating in, without actually using the input device. In an example, the input device may comprise four light emitting diodes that emit red light when the input device is operated in the first mode of operation, or emit green light when the input device is operated in the second mode of operation.

Optionally, the input device and/or the user device comprise a means for detecting a gaze direction of the user, wherein said means is configured to generate information indicative of a current gaze direction of the user. The processor is configured to process said information to generate a corresponding input for the visual scene. Additionally, or alternatively, optionally, the means for detecting a gaze direction of the user is arranged in the real-world environment where the user uses the input device. As an example, the user may move his/her gaze from left to right, and the processor may generate a corresponding input for a pointer of the visual scene to move from a left region to a right region within the visual scene.

Optionally, means for tracking head orientation of the user generates an information indicative of head orientation of the user. The processor is configured to process said information to generate a corresponding input for the visual scene. Notably, said means is arranged on the user's head. Optionally, the user device is worn by the user on his/her head, wherein the user device comprises the means for tracking head orientation.

Optionally, the input device is charged by the user device or any other active device (for example, such as, a central processing unit, a smart television and the like) associated with the input device. Notably, the input device is charged via a wired connection or an inductive means. In a case when the input device is charged using the inductive means, an electric coil of the input device is used for charging the input device.

The present disclosure also relates to the aforementioned system comprising the user device and the input device. Various embodiments and variants disclosed above, with respect to the aforementioned first aspect, apply mutatis mutandis to the system.

Throughout the present disclosure, the term "user interface" refers to a space that allows for interaction between the user and the system. Therefore, the term "user interface" can also be understood to be a "human-machine interface". The user interface is generally rendered upon a display screen of the user device. The user interacts with the user interface, via the input device. Optionally, the user interface has a customisable aesthetic appearance.

Optionally, in the system, the input device further comprises a timer that, in operation, measures a time period during which the input device is in a given state, the given state of the input device is indicative of one of: the input device lying on the given object, the input device being held in air, the input device being in transition, wherein the processor of the input device is configured to control the input device to operate in the first mode of operation or the second mode of operation based on the time period during which the input device is in the given state.

Optionally, in the system, the processor of the input device is configured to control the input device to operate in any of: the first mode of operation, the second mode of operation, a third mode of operation, based on the distance of the given object from the given surface of the input device.

Optionally, in the system, the processor of the input device is configured to:

process the first sensor data to detect whether the input device is being held with a single hand of the user or with both hands of the user; and control the input device to activate or deactivate a given feature provided to the user during a given mode of operation, depending on whether the input device is being held with the single hand of the user or with both the hands of the user.

Optionally, in the system, the processor of the input device is configured to:

process the first sensor data to detect a manner in which the user grips the input device; and control the input device to operate in the first mode of operation or the second mode of operation based on the manner in which the user grips the input device.

Optionally, in the system, the input device further comprises at least one second sensor that, in operation, measures second sensor data indicative of at least one of: a position and an orientation of a hand of the user that is not used to hold the input device, a posture of the user, wherein the processor of the input device is configured to:

process the second sensor data to determine the position and the orientation of the hand and/or the posture of the user; and control the input device to operate in the first mode of operation or the second mode of operation based on the position and the orientation of the hand and/or the posture of the user.

The present disclosure also relates to the aforementioned method. Various embodiments and variants disclosed above, with respect to the aforementioned first aspect and the aforementioned second aspect, apply mutatis mutandis to the method.

Optionally, the method further comprises measuring, via a timer of the input device, a time period during which the input device is in a given state, the given state of the input device is indicative of one of: the input device lying on the given object, the input device being held in air, the input device being in transition, wherein the step of controlling the input device is performed based on the time period during which the input device is in the given state.

Optionally, the method further comprises controlling the input device to operate in any of: the first mode of operation, the second mode of operation, a third mode of operation, based on the distance of the given object from the given surface of the input device.

Optionally, the method further comprises:

processing the first sensor data to detect whether the input device is being held with a single hand of the user or with both hands of the user; and controlling the input device to activate or deactivate a given feature provided to the user during a given mode of operation, depending on whether the input device is being held with the single hand of the user or with both the hands of the user.

Optionally, the method further comprises:

processing the first sensor data to detect a manner in which the user grips the input device; and controlling the input device to operate in the first mode of operation or the second mode of operation based on the manner in which the user grips the input device.

Optionally, the method further comprises:

measuring, via at least one second sensor of the input device, second sensor data indicative of at least one of: a position and an orientation of a hand of the user that is not used to hold the input device, a posture of the user;

processing the second sensor data to determine the position and the orientation of the hand and/or the posture of the user; and controlling the input device to operate in the first mode of operation or the second mode of operation based on the position and the orientation of the hand and/or the posture of the user.

DETAILED DESCRIPTION OF THE DRAWINGS

Figure 1:
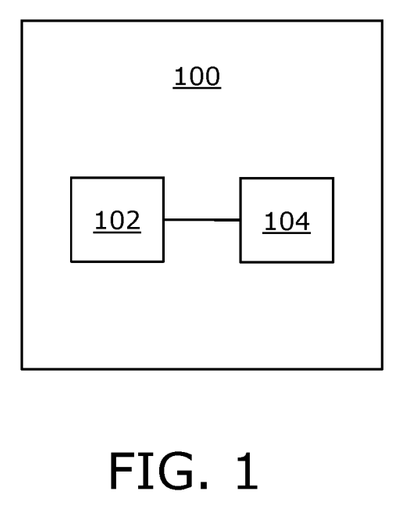
FIGS. 1, 2 and 3 are block diagrams of architectures of an input device, in accordance with various embodiments of the present disclosure.

Referring to FIG. 1, illustrated is a block diagram of architecture of an input device 100, in accordance with an embodiment of the present disclosure. The input device 100 comprises at least one first sensor (depicted as a first sensor 102), and a processor 104 coupled to the first sensor 102. The first sensor 102, in operation, measures first sensor data indicative of at least one of: a pressure applied to a given surface of the input device 100, a presence or an absence of a given object in a proximity of the given surface of the input device 100, a distance of the given object from the given surface of the input device 100, a position and an orientation of the input device 100. The processor 104 is configured to:

process the first sensor data to determine a state of the input device 100, wherein the state of the input device 100 is indicative of whether or not the input device 100 is lying on the given object;

obtain, from a user device (not shown), context information pertaining to a visual scene being presented to a user; and control the input device 100 to operate in a first mode of operation or a second mode of operation based on the determined state of the input device 100 and the obtained context information, wherein the input device 100, in operation, acts as a computer mouse during the first mode of operation and as a six-degrees-of-freedom controller during the second mode of operation.

Figure 2:
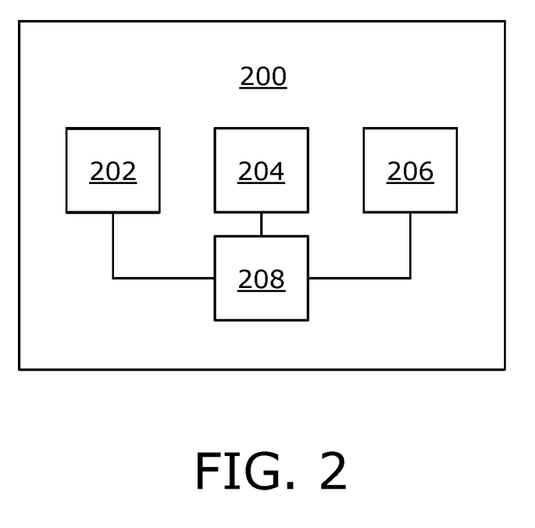

Referring to FIG. 2, illustrated is a block diagram of architecture of an input device 200, in accordance with another embodiment of the present disclosure. The input device 200 comprises at least one first sensor (depicted as first sensors 202, 204 and 206) and a processor 208 coupled to the first sensors 202, 204 and 206.

Figure 3:
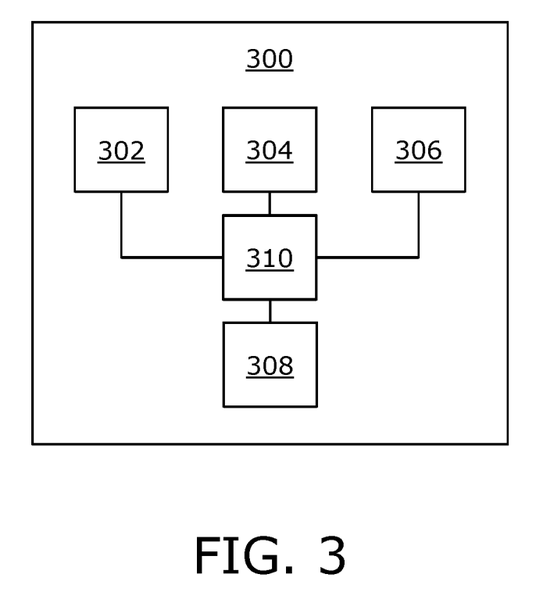

Referring to FIG. 3, illustrated is a block diagram of architecture of an input device 300, in accordance with yet another embodiment of the present disclosure. The input device 300 comprises at least one first sensor 302, a second sensor 304, a timer 306, a means 308 for changing a form factor, and a processor 310. The first sensor 302, the second sensor 304, the timer 306, and the means 308 for changing the form factor are coupled to the processor 310.

The second sensor 304 in operation, measures second sensor data indicative of at least one of: a position and an orientation of a hand of the user that is not used to hold the input device 300, a posture of the user. The processor 310 is configured to process the second sensor data to determine the position and the orientation of the hand and/or the posture of the user; and control the input device 300 to operate in the first mode of operation or the second mode of operation based on the position and the orientation of the hand and/or the posture of the user.

The timer 306, in operation, measures a time period during which the input device 300 is in a given state, the given state of the input device 300 is indicative of one of: the input device 300 lying on the given object, the input device 300 being held in air, the input device 300 being in transition. The processor 310 of the input device 300 is configured to control the input device 300 to operate in the first mode of operation or a second mode of operation based on the time period during which the input device 300 is in the given state.

The means 308 for changing the form factor is employed by the processor 310 for changing a form factor of the input device 300, when the mode of operation of the input device 300 changes from/to the first mode of operation to/from the second mode of operation.

FIGS. 1, 2, and 3 are merely examples, which should not unduly limit the scope of the claims herein. It is to be understood that the specific designation for input devices 100, 200, and 300 is provided as an example and is not to be construed as limiting the input devices 100, 200, and 300 to specific numbers of components. A person skilled in the art will recognize many variations, alternatives, and modifications of embodiments of the present disclosure.

Figure 4A:
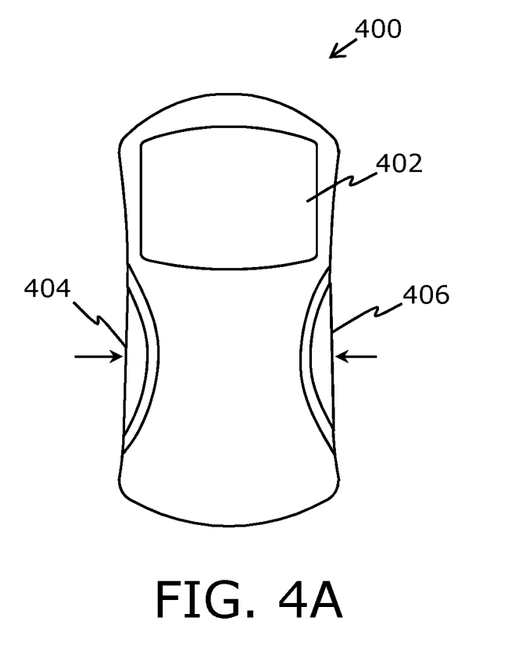
FIGS. 4A and 4B are schematic illustrations of functioning of a means for changing a form factor of an input device, in accordance with different embodiments of the present disclosure.
Figure 4B:
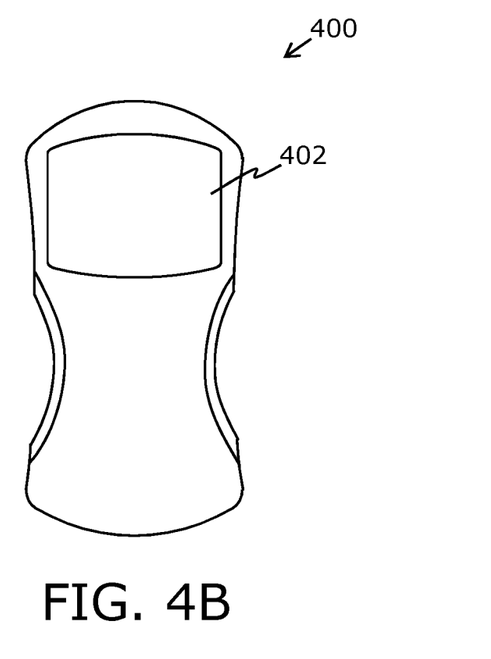

Referring to FIGS. 4A and 4B, illustrated are schematic illustrations of functioning of a means for changing a form factor of an input device 400, in accordance with different embodiments of the present disclosure. It may be understood by a person skilled in the art that the FIGS. 4A and 4B include schematic diagrams of functioning of the means for changing the form factor of the input device 400 for sake of clarity, which should not unduly limit the scope of the claims herein. The person skilled in the art will recognize many variations, alternatives, and modifications of embodiments of the present disclosure.

As shown in FIGS. 4A and 4B, the input device 400 comprises a first sensor 402, and the means (not shown) for changing the form factor of the input device 400. The means for changing the form factor is employed by a processor (not shown) of the input device 400 to change the form factor of the input device 400 when the mode of operation of the input device 400 changes from/to a first mode of operation to/from a second mode of operation. The means for changing the form factor is coupled to two movable sides of the input device 400, such as a first movable side 404 and a second movable side 406. Two arrows shown alongside the first and second movable sides 404 and 406 indicate a direction of movement of the first and second movable sides 404 and 406. Notably, the first and second movable sides 404 and 406 are movable to extend outwards (as shown in FIG. 4A) or to compress inwards (as shown in FIG. 4B).

In FIG. 4A, the input device 400 operates in the first mode of operation. In the first mode of operation, the input device 400 acts as a computer mouse. As shown, in such a case, both the first and second movable sides 404 and 406 extend outwards, thereby allowing the input device 400 to emulate the computer mouse in terms of physical structure.

In FIG. 4B, the input device 400 operates in the second mode of operation. In the second mode of operation, the input device 400 acts as a six-degrees-of-freedom controller. In such a case, both the first and second movable sides 404 and 406 are compressed inwards (and are therefore invisible), thereby allowing the input device 400 to emulate the six-degrees-of-freedom controller and snugly fit into a hand of a user holding the input device 400.

Figure 5:
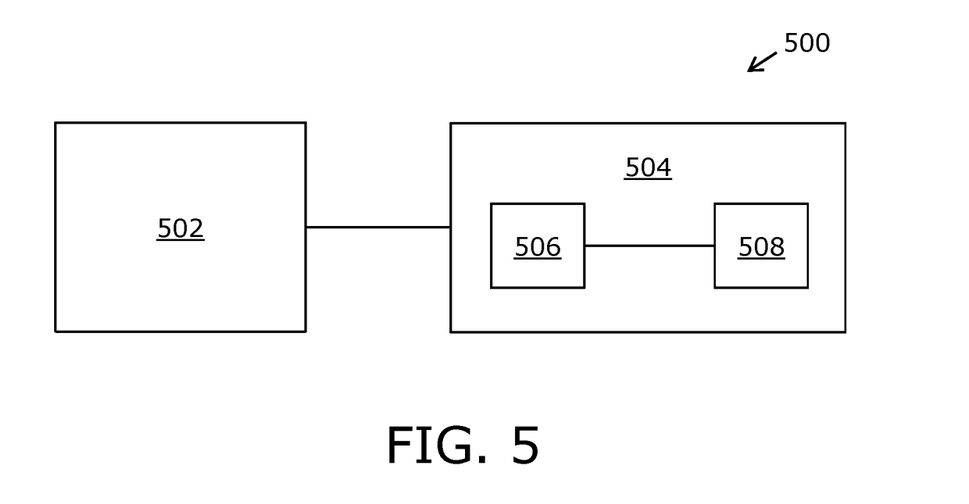
FIG. 5 is block diagram of architecture of a system, in accordance with an embodiment of the present disclosure.

Referring to FIG. 5, illustrated is a block diagram of architecture of a system 500, in accordance with an embodiment of the present disclosure. The system 500 comprises a user device 502 and an input device 504. The user device 502, in operation, provides a user with a user interface. The input device 504 is communicably coupled to the user device 502. The input device 504 comprises at least one first sensor (depicted as a first sensor 506) and a processor 508 coupled to the first sensor 506. The first sensor 506, in operation, measures first sensor data indicative of at least one of: a pressure applied to a given surface of the input device 504, a presence or an absence of a given object in a proximity of the given surface of the input device 504, a distance of the given object from the given surface of the input device 504, a position and an orientation of the input device 504. The processor 508 is configured to:

process the first sensor data to determine a state of the input device 504, wherein the state of the input device 504 is indicative of whether or not the input device 504 is lying on the given object;

obtain, from the user device 502, context information pertaining to a visual scene being presented to the user; and control the input device 504 to operate in a first mode of operation or a second mode of operation based on the determined state of the input device 504 and the obtained context information, wherein the system enables the user to interact with the user interface by operating the input device 504 as a computer mouse during the first mode of operation and as a six-degrees-of-freedom controller during the second mode of operation.

It may be understood by a person skilled in the art that FIG. 5 depicts a simplified architecture of the system 500 for sake of clarity, which should not unduly limit the scope of the claims herein. The person skilled in the art will recognize many variations, alternatives, and modifications of embodiments of the present disclosure.

Figure 6:
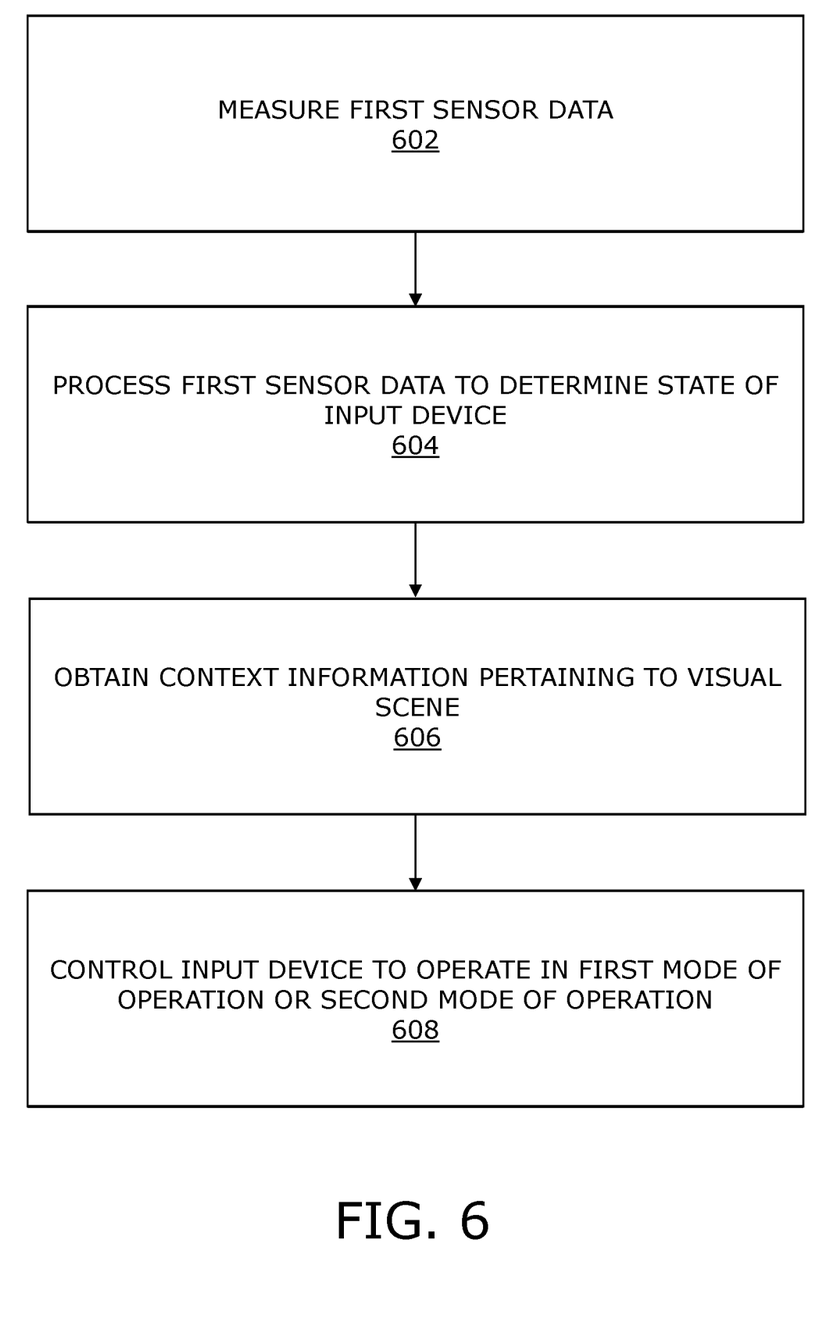
FIG. 6 illustrates steps of a method, in accordance with an embodiment of the present disclosure.

Referring to FIG. 6, illustrated are steps of a method, in accordance with an embodiment of the present disclosure. At a step 602, first sensor data is measured, via at least one first sensor of an input device. The first sensor data is indicative of at least one of: a pressure applied to a given surface of the input device, a presence or an absence of a given object in a proximity of the given surface of the input device, a distance of the given object from the given surface of the input device, a position and an orientation of the input device. At a step 604, the first sensor data is processed to determine a state of the input device. The state of the input device is indicative of whether or not the input device is lying on the given object. At a step 606, context information pertaining to a visual scene being presented to a user is obtained from a user device. At a step 608, the input device is controlled to operate in a first mode of operation or a second mode of operation based on the determined state of the input device and the obtained context information. The input device is operated as a computer mouse during the first mode of operation and as a six-degrees-of-freedom controller during the second mode of operation.

The steps 602 to 608 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. An input device comprising:
   at least one first sensor that, in operation, measures first sensor data indicative of at least one of: a pressure applied to a given surface of the input device, a presence or an absence of a given object in a proximity of the given surface of the input device, a distance of the given object from the given surface of the input device, a position and an orientation of the input device; and
   a processor coupled to the at least one first sensor, the processor being configured to:
      process the first sensor data to determine a state of the input device, wherein the state of the input device is indicative of whether or not the input device is lying on the given object;
      obtain, from a user device, context information pertaining to a visual scene being presented to a user; and
      control the input device to operate in a first mode of operation or a second mode of operation based on the determined state of the input device and the obtained context information, wherein the input device, in operation, acts as a computer mouse during the first mode of operation and as a six-degrees-of-freedom controller during the second mode of operation.

2. The input device of claim 1, further comprising a timer that, in operation, measures a time period during which the input device is in a given state, the given state of the input device is indicative of one of: the input device lying on the given object, the input device being held in air, the input device being in transition, wherein the processor is configured to control the input device to operate in the first mode of operation or the second mode of operation based on the time period during which the input device is in the given state.

3. The input device of claim 1, wherein the processor is configured to control the input device to operate in any of: the first mode of operation, the second mode of operation, a third mode of operation, based on the distance of the given object from the given surface of the input device.

4. The input device of claim 1, wherein the processor is configured to:
   process the first sensor data to detect whether the input device is being held with a single hand of the user or with both hands of the user; and
   control the input device to activate or deactivate a given feature provided to the user during a given mode of operation, depending on whether the input device is being held with the single hand of the user or with both the hands of the user.

5. The input device of claim 1, wherein the processor is configured to:
   process the first sensor data to detect a manner in which the user grips the input device; and
   control the input device to operate in the first mode of operation or the second mode of operation based on the manner in which the user grips the input device.

6. The input device of claim 1, further comprising at least one second sensor that, in operation, measures second sensor data indicative of at least one of: a position and an orientation of a hand of the user that is not used to hold the input device, a posture of the user, wherein the processor is configured to:
   process the second sensor data to determine the position and the orientation of the hand and/or the posture of the user; and
   control the input device to operate in the first mode of operation or the second mode of operation based on the position and the orientation of the hand and/or the posture of the user.

7. The input device of claim 1, further comprising means for changing a form factor of the input device, wherein the processor is configured to employ said means when the mode of operation of the input device changes from/to the first mode of operation to/from the second mode of operation.

8. A system comprising:
   a user device that, in operation, provides a user with a user interface; and
   an input device communicably coupled to the user device, the input device comprising:
      at least one first sensor that, in operation, measures first sensor data indicative of at least one of: a pressure applied to a given surface of the input device, a presence or an absence of a given object in a proximity of the given surface of the input device, a distance of the given object from the given surface of the input device, a position and an orientation of the input device; and
      a processor coupled to the at least one first sensor, the processor being configured to:
         process the first sensor data to determine a state of the input device, wherein the state of the input device is indicative of whether or not the input device is lying on the given object;
         obtain, from the user device, context information pertaining to a visual scene being presented to the user; and
         control the input device to operate in a first mode of operation or a second mode of operation based on the determined state of the input device and the obtained context information,
   wherein the system enables the user to interact with the user interface by operating the input device as a computer mouse during the first mode of operation and as a six-degrees-of-freedom controller during the second mode of operation.

9. The system of claim 8, wherein the input device further comprises a timer that, in operation, measures a time period during which the input device is in a given state, the given state of the input device is indicative of one of: the input device lying on the given object, the input device being held in air, the input device being in transition,
   wherein the processor of the input device is configured to control the input device to operate in the first mode of operation or the second mode of operation based on the time period during which the input device is in the given state.

10. The system of claim 8, wherein the processor of the input device is configured to control the input device to operate in any of: the first mode of operation, the second mode of operation, a third mode of operation, based on the distance of the given object from the given surface of the input device.

11. The system of claim 8, wherein the processor of the input device is configured to:
  process the first sensor data to detect whether the input device is being held with a single hand of the user or with both hands of the user; and
  control the input device to activate or deactivate a given feature provided to the user during a given mode of operation, depending on whether the input device is being held with the single hand of the user or with both the hands of the user.

12. The system wherein the processor of the input device is configured to:
  process the first sensor data to detect a manner in which the user grips the input device; and
  control the input device to operate in the first mode of operation or the second mode of operation based on the manner in which the user grips the input device.

13. The system claim 8, wherein the input device further comprises at least one second sensor that, in operation, measures second sensor data indicative of at least one of: a position and an orientation of a hand of the user that is not used to hold the input device, a posture of the user, wherein the processor of the input device is configured to:
  process the second sensor data to determine the position and the orientation of the hand and/or the posture of the user; and
  control the input device to operate in the first mode of operation or the second mode of operation based on the position and the orientation of the hand and/or the posture of the user.

14. A method comprising:
  measuring, via at least one first sensor of an input device, first sensor data indicative of at least one of: a pressure applied to a given surface of the input device, a presence or an absence of a given object in a proximity of the given surface of the input device, a distance of the given object from the given surface of the input device, a position and an orientation of the input device;
  processing the first sensor data to determine a state of the input device, wherein the state of the input device is indicative of whether or not the input device is lying on the given object;
  obtaining, from a user device, context information pertaining to a visual scene being presented to a user; and
  controlling the input device to operate in a first mode of operation or a second mode of operation based on the determined state of the input device and the obtained context information, wherein the input device is operated as a computer mouse during the first mode of operation and as a six-degrees-of-freedom controller during the second mode of operation.

15. The method of claim 14, further comprising measuring, via a timer of the input device, a time period during which the input device is in a given state, the given state of the input device is indicative of one of: the input device lying on the given object, the input device being held in air, the input device being in transition, wherein the step of controlling the input device is performed based on the time period during which the input device is in the given state.

16. The method of claim 14, further comprising controlling the input device to operate in any of: the first mode of operation, the second mode of operation, a third mode of operation, based on the distance of the given object from the given surface of the input device.

17. The method of claim 14, further comprising:
  processing the first sensor data to detect whether the input device is being held with a single hand of the user or with both hands of the user; and
  controlling the input device to activate or deactivate a given feature provided to the user during a given mode of operation, depending on whether the input device is being held with the single hand of the user or with both the hands of the user.

18. The method of 14, further comprising:
  processing the first sensor data to detect a manner in which the user grips the input device; and
  controlling the input device to operate in the first mode of operation or the second mode of operation based on the manner in which the user grips the input device.

19. The method of claim 14, further comprising:
  measuring, via at least one second sensor of the input device, second sensor data indicative of at least one of: a position and an orientation of a hand of the user that is not used to hold the input device, a posture of the user;
  processing the second sensor data to determine the position and the orientation of the hand and/or the posture of the user; and
  controlling the input device to operate in the first mode of operation or the second mode of operation based on the position and the orientation of the hand and/or the posture of the user.

\* \* \* \* \*